United States Patent [19]
Simodi, Jr.

[11] Patent Number: 5,476,288
[45] Date of Patent: Dec. 19, 1995

[54] SAFETY BELT SYSTEM AND ADJUSTING DEVICE THEREFOR

[76] Inventor: George A. Simodi, Jr., 329 Burkhart Ave., NE., Canton, Ohio 44704-2525

[21] Appl. No.: 279,800

[22] Filed: Jul. 25, 1994

[51] Int. Cl.$^6$ ................................................. B60R 22/30
[52] U.S. Cl. ......................... 280/808; 297/483; 24/68 SB
[58] Field of Search ..................... 280/801, 808; 297/468, 483; 24/68 SB, 132 WL, 489, 168, 171

[56] References Cited

U.S. PATENT DOCUMENTS

| | | | |
|---|---|---|---|
| 3,065,513 | 11/1962 | Warner et al. | 24/265 AL |
| 4,041,580 | 8/1977 | Turner et al. | 24/265 AL |
| 4,378,947 | 4/1983 | Föhl | 280/808 |
| 4,786,078 | 11/1988 | Schreier et al. | 280/808 |
| 4,810,036 | 3/1989 | Buser | 297/483 |
| 4,832,367 | 5/1989 | Lisenby | 280/808 |
| 4,946,198 | 8/1990 | Pittore et al. | 280/808 |
| 5,042,838 | 8/1991 | Carter | 280/808 |
| 5,080,396 | 1/1992 | Vacanti | 280/808 |
| 5,135,257 | 8/1992 | Short | 280/808 |
| 5,154,446 | 10/1992 | Blake | 280/808 |
| 5,201,099 | 4/1993 | Campbell | 24/198 |

FOREIGN PATENT DOCUMENTS 0023346 of 1894 United Kingdom ..................... 24/168
0013000 7/1993 United Kingdom ..................... 24/168

*Primary Examiner*—Karin L. Tyson
*Assistant Examiner*—Paul N. Dickson
*Attorney, Agent, or Firm*—Sand & Sebolt

[57] ABSTRACT

A safety belt adjusting device adapted to be secured to a three point safety belt. The safety belt adjustment device includes a pair of parallel and spaced apart rods having a threaded portion at one end, and an enlarged head opposite the threaded portion. A nut engages the threaded portion of each of the rods. Each of the rods extends through an aperture formed through a first rod retaining plate such that the plate is adjacent the enlarged heads of the rods. Similarly, the rods extend through respective apertures formed through a second rod retaining plate such that the rod retaining plate is adjacent the nuts. A sleeve extends over each rod intermediate the first and second rod retaining plate to form a belt slot having a length substantially equal to the sleeves, and a width substantially equal to the distance between the respective rods. When installed, a lap belt and a shoulder belt of a three point safety belt extend through the belt slot such that the safety belt adjusting device may be moved between a first position adjacent a buckle, toward a second position adjacent a lower frame support where the lap belt is secured to a vehicle.

13 Claims, 2 Drawing Sheets

SAFETY BELT SYSTEM AND ADJUSTING DEVICE THEREFOR

BACKGROUND OF THE INVENTION

1. Technical Field

The invention relates generally to a safety belt adjusting device. More particularly, the invention relates to shoulder belt adjusting devices for use on a standard three-point restraint system. Specifically, the invention relates to an improved shoulder belt adjusting device for adjusting the shoulder belt away from a passenger's neck or face.

2. Background Information

As safety regulations become increasingly stringent for manufacturers, and automobiles continue to reduce in size, safety belts are becoming increasingly important to both manufacturers, and the purchasing public. This importance is best exemplified in that many states have now passed safety belt laws; or laws which impose a fine if front seat passengers do not wear safety belts. These laws, in combination with the industries increased focus upon safety, has caused more and more people to begin using safety belts.

One common safety belt is the three-point restraint system used in most vehicles, such as automobiles, trucks, etc. These systems generally include a lap belt which extends across the passenger's lap, and a shoulder belt which extends up across the passenger's chest and shoulder to provide protection to the passenger from being thrown forward in the event of a sudden impact or stop. While most three-point safety belts are adjustable for different size passengers and drivers in that the overall length of the belt may be varied, the three points themselves are generally fixed in the automobile.

Specifically, the two securing points of the shoulder belt are fixed, one at the releasable buckle and the other at the upper frame support. Accordingly, the position of the shoulder belt relative to the passenger varies with the size of the passenger. The upper frame support is located sufficiently high to permit effective use of the shoulder belt for relatively tall passengers. As a result, when relatively short passengers, including children or small adults, use the three-point safety belt, the shoulder belt will be uncomfortably high on the passenger, possibly in contact with the neck of the passenger or, in extreme cases, across the passenger's face.

Heretofore, attempts have been made to position the belt away from the passengers neck without sacrificing the practical safety of the safety belt. For example, one prior device uses the door of the vehicle to support a bracket and flexible strap to pull the shoulder belt away from the passenger's neck, while other prior devices adjust the height of the shoulder belt through an auxiliary strap. However, it is believed that these devices have not proven to be commercially successful since they are cumbersome, difficult to use, and in some instances thwart the safety operation of the safety belt system.

Other devices clip to the lap belt and include a clip to hold the shoulder belt. These devices slide along the lap belt and move the angle of the shoulder belt such that it does not contact the passenger's neck. U.S. Pat. No. 5,154,446 discloses one such device. However, this device is relatively large and merely frictionally engages the belt to retain it in position. The frictional engagement will also make this device difficult to adjust for a variety of users.

U.S. Pat. No. 5,201,099 is also directed to a lap belt clip. However, this device is also relatively large and does not retain both the shoulder belt and lap belt within a closed belt slot. This device may also cause the shoulder belt to kink adjacent the safety belt adjusting device, as it does not guide the shoulder belt toward an adjusted angle of operation.

U.S. Pat. No. 5,042,838 is directed to a similar device, and is also relatively large. This device while presumably sufficient for the purpose for which it was intended, is significantly larger than the overall belt width, thereby adding further mass to the belt system in the event of impact. This device also may cause the shoulder belt to kink adjacent the safety belt adjusting device, as it does not guide the shoulder belt toward an adjusted angle of operation.

Thus, while a number of prior art devices have been developed, and are presumably adequate for the purposes for which they are intended, these prior art devices are generally large, and do not retain the belt within a belt slot, but merely clip to the belt, such that they may be pulled loose from the belt as the passenger exits the automobile. Further, none of the above devices guide the shoulder belt toward its new angle of operation possibly causing the shoulder belt to kink adjacent the safety belt adjusting device, thereby significantly reducing the belt's comfort, and effectiveness as discussed above.

Therefore, the need exists for a safety belt adjusting device which is small, lightweight, easy to adjust, and remains attached to the belt when not in use. Further, the need exists for a safety belt adjustment device which will guide the shoulder belt to the adjusted angle of operation without kinking the belt.

SUMMARY OF THE INVENTION

Objectives of the invention include providing an improved safety belt adjusting device for adjusting the shoulder belt of a three-point safety belt system relative to the passenger.

A further objective of the invention includes providing such a safety belt adjusting device which is extremely small and lightweight.

Another objective of the invention is to provide such a safety belt adjusting device which may be easily used by all passengers regardless of the passenger's size.

Yet another objective of the invention is to provide such a safety belt adjusting device which is secured to the belt such that the adjusting device remains on the belt when the belt is both in the latched and unlatched positions.

Still another objective of the invention is to provide such a safety belt adjusting device which may be easily positioned on the lap belt.

A still further objective of the invention is to provide such a safety belt adjusting device which will guide the shoulder belt to the adjusted angle of operation.

A further objective of the invention is to provide such a safety belt adjusting device which is of simple construction, which achieves the stated objectives in a simple, effective and inexpensive manner, which solves problems and satisfies needs existing in the art.

These and other objectives and advantages of the improved invention are obtained by the safety belt adjusting device for adjusting a shoulder belt relative to a passenger, the general nature of which may be stated as including a pair of spaced apart rods, each rod having a first end and a second end; a first rod retaining means adjacent the first ends of said pair of rods for retaining the rods in the spaced apart relationship; a second rod retaining means adjacent the second end of said pair of rods for retaining the rods in a spaced apart relationship; release means for releasing one of the first and second rod retaining means from at least one of the rods; and said first and second rod retaining means permitting rotational movement of one of said rods relative to the other of said rods.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

Figure 4:
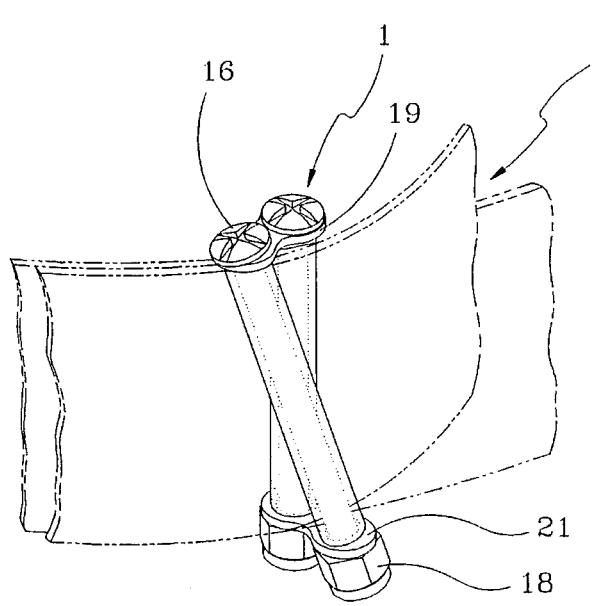
FIG. 4 is a perspective view of the safety belt adjusting device shown installed on a safety belt cut away and depicted in dot dash lines.

The improved safety belt adjusting device is indicated generally at 1, and is adapted to receive a three-point safety belt, a portion of which is illustrated in FIG. 4 in dot-dash lines, and is indicated generally at 2.

Figure 6:
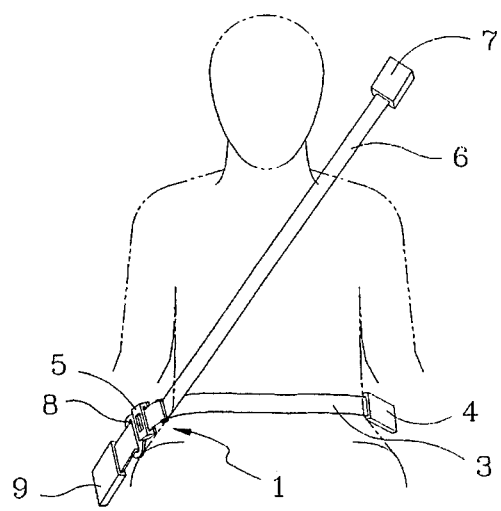
FIG. 6 illustrates a safety belt system shown in association with a passenger in dot dash lines, and with the safety belt adjusting device in a first position.

Safety belt 2 is of the general three-point type and includes a lap belt 3 extending across the passenger's legs or stomach from a lower frame support 4 to a buckle 5 (FIG. 6). Further, a shoulder belt 6 extends from buckle 5, diagonally across the passenger's chest to an upper frame support 7 (FIG. 6). Buckle 5 latches to a catch 8 attached to a support 9 as shown in FIG. 6.

Figure 3:
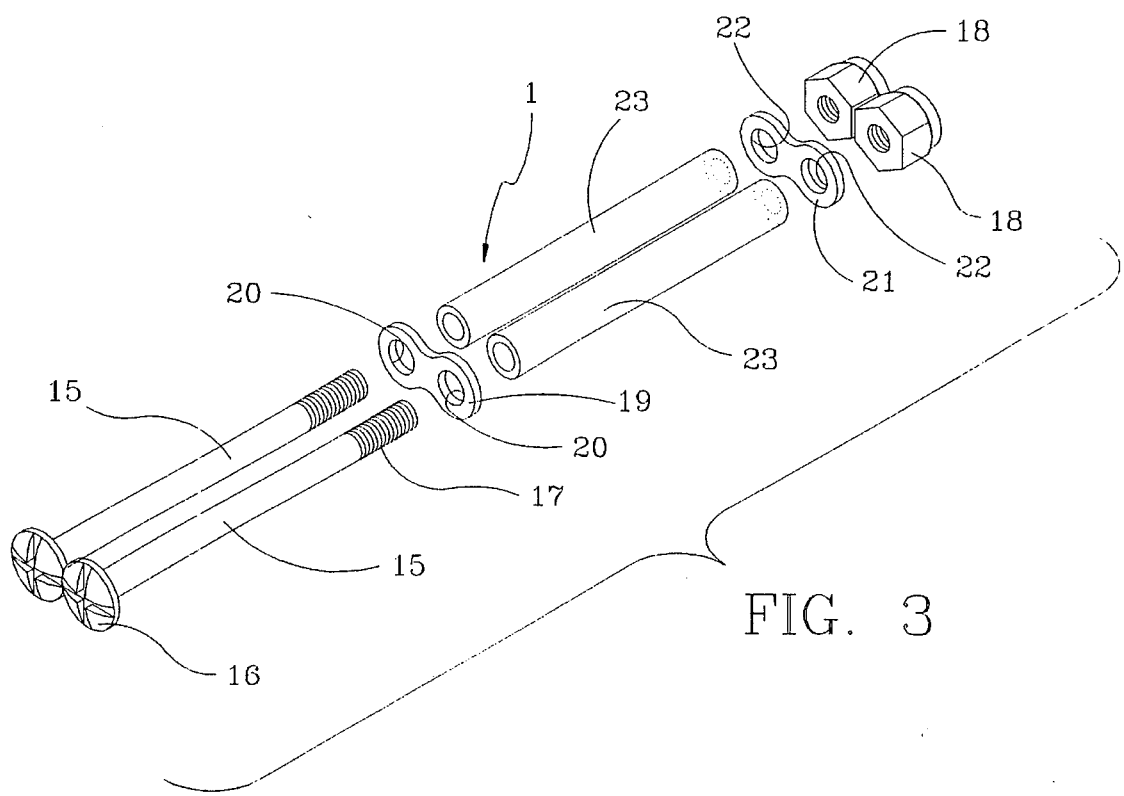
FIG. 3 is an exploded perspective view of the safety belt adjustment device shown in FIG. 1.
Figure 2:
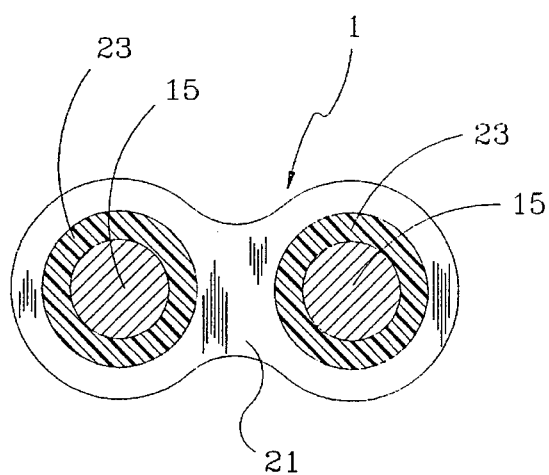
FIG. 2 is an enlarged sectional view taken along line 2—2, FIG. 1.
Figure 1:
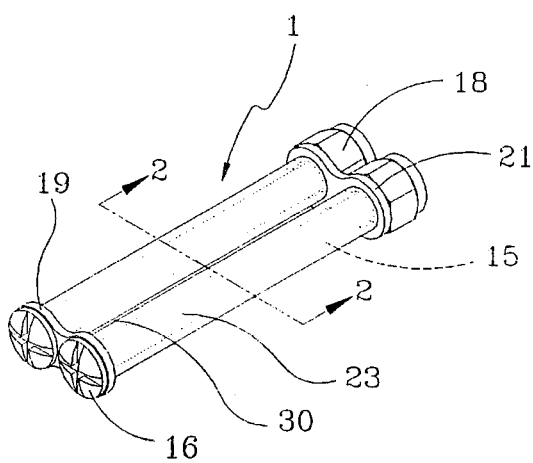
FIG. 1 is a perspective view of the safety belt adjusting device.

Referring specifically to FIGS. 1–3, safety belt adjustment device 1 includes a pair of parallel and spaced apart rods or bolts 15, each of which includes an enlarged head 16 and a threaded end portion 17. Enlarged head 16 may be the head of a standard bolt.

A nut 18 threadably engages threaded portion 17 of each rod 15. A first rod retaining plate 19 includes two apertures 20, each sized to accept a respective rod 15. Each rod 15 extends through a respective aperture 20 such that first rod retaining plate 19 abuts enlarged head 16. Similarly, a second rod retaining plate 21 includes two apertures 22, each sized to accept a respective rod 15. Rods 15 extend through apertures 22 such that second rod retaining plate 21 abuts nuts 18.

A plastic sleeve 23 extends over each rod 15 and intermediate first and second rod retaining plates 19 and 21. First rod retaining plate 19 thus is interposed between enlarged heads 16 and sleeves 23, and second rod retaining plate 21 is interposed between nuts 18 and sleeves 23. In accordance with one of the main features of the invention, assembled adjusting device 1 shown specifically in FIG. 1 defines a belt slot 30 formed between sleeves 23, having a length equal to sleeves 23.

In operation, one nut 18 is removed from a corresponding rod 15, and rod 15 is removed from rod retainer plate 21. Lap belt 3 and shoulder belt 6 are then positioned in belt slot 30 intermediate sleeves 23. Rod 15 and nut 18 are then reassembled securing lap belt 3 and shoulder belt 6 within belt slot 30 of safety belt adjusting device 1 as shown specifically in FIG. 4. Referring to FIG. 6, a safety belt adjustment device 1 is shown installed on a three point safety belt 2, positioned adjacent buckle 5. Note that a review of FIG. 6 indicates that shoulder belt 6 is positioned very near the passenger's neck and face, creating both an uncomfortable and potentially dangerous situation.

Figure 7:
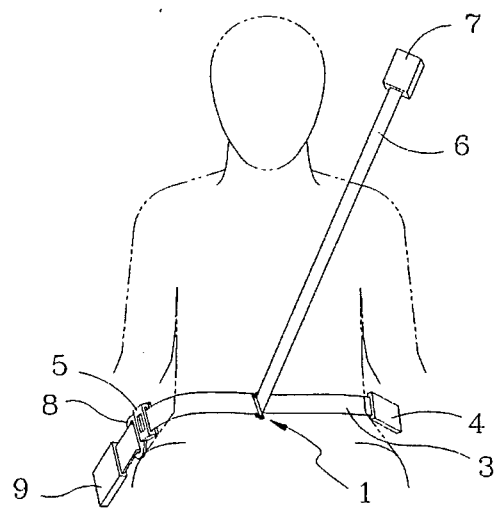
FIG. 7 illustrates a safety belt system shown in association with a passenger in dot dash lines, and with the safety belt adjusting device in a second position.

Referring then to FIG. 7, safety belt adjusting device 1 may be moved away from buckle 5 and toward lower frame support 4 until a position substantially in the middle of the passenger's stomach is reached. In this position, the angle of shoulder belt 6 relative to lap belt 3 has been significantly increased. Further, the belt has been moved to a position across the passenger's chest and shoulder, rather than across the passenger's chest and neck.

Further, inasmuch as rods 15 extend through apertures 20 and 22, first and second rod retaining plates 19 and 21 may be rotated to a skewed position relative to rods 15 as shown in FIG. 4. In accordance with one of the main features of the invention, first rod retaining plate 19 may be rotated clockwise, and second rod retaining plate 21 may be rotated counterclockwise such that one rod 15 assumes an angled or skewed orientation relative to the second rod 15. Safety belt adjusting device 1 thus guides shoulder belt 6 toward its adjusted angle of operation relative to lap belt 3.

Figure 5:
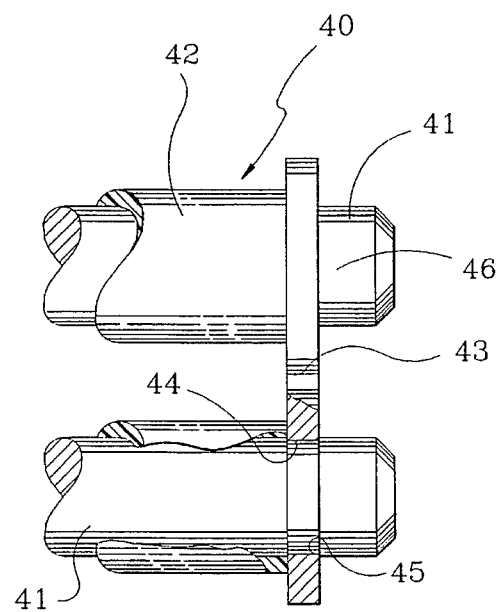
FIG. 5 is a fragmentary top plan view of a second embodiment of the invention shown with portions cut away and in section.

A second embodiment of the invention is shown in FIG. 5 and is indicated generally at 40. Safety belt adjusting device 40 operates essentially identical to safety belt adjusting device 1 in that it includes a pair of rods 41, a pair of corresponding sleeves 42, a first rod retaining plate 43, and a second rod retaining plate 44 (not shown). However, rods 41 include an intermediate stepped down portion 44 complementary sized to a corresponding aperture 45 extending through first rod retaining plate 43.

In operation, an outer portion 46 of each rod 41 has sufficient flexibility to pass through an aperture 45. Once outer portion 46 passes through aperture 45, rod 41 will be snap-fitted into aperture 45 via the communication between step down portion 44, having a diameter substantially equal to that of aperture 45, and aperture 45.

In summary, safety belt adjusting devices 1 and 40 are extremely small, and may either be permanently installed on a lap belt, or easily removed and reinstalled with very little effort. Moreover, safety belt adjusting devices 1 and 40 of the present invention may be angled to guide the newly positioned shoulder belt toward its new angle of operation. Lastly, the device may be easily adjusted to move the shoulder belt 6 to a comfortable position for a variety of drivers, or may not be used at all, while remaining installed on the belt by positioning device 1 adjacent buckle 5 as shown in FIG. 6.

Accordingly, the improved safety belt adjusting device is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved safety belt adjustment device is constructed and used, the characteristics of the construction, and the advantageous, new and useful results obtained; the new and useful structures, devices, elements, arrangements, parts and combinations, are set forth in the appended claims.

I claim:

1. A safety belt adjusting device adapted to operatively engage a three point safety belt system of the type having a lap belt and a shoulder belt, and a buckle, said safety belt adjusting device comprising:

a pair of spaced apart rods, each rod having a first end and a second end;

a first rod retaining means adjacent the first ends of said pair of rods for retaining the rods in the spaced apart relationship;

a second rod retaining means adjacent the second end of said pair of rods for retaining the rods in a spaced apart relationship;

the first and second rod retaining means are spaced apart plates, with each plate consisting of a pair of holes for accepting the rods, and in which the plates are rotatably mounted on the pair of rods to permit the rods to move to a skewed position relative to one another to guide the shoulder belt when said safety belt adjusting device is positioned adjacent the passenger's stomach;

a sleeve extending over each of said rods, and extending between the first and second rod retaining means;

release means for releasing one of the first and second rod retaining means from at least one of the rods;

said first and second rod retaining means permitting rotational movement of one of said rods relative to the other of said rods; and said pair of spaced apart rods defining a belt slot therebetween which accepts both the lap belt and the shoulder belt for sliding movement on said lap and shoulder belt between a first position adjacent said buckle and a second position adjacent a passenger's stomach to substantially increase the angle of the shoulder belt relative to the lap belt, and move the shoulder belt away from a passenger's neck.

2. A safety belt adjusting device as defined in claim 1 in which the spaced apart plates are substantially parallel to each other, and substantially orthogonal to said pair of rods.

3. A safety belt adjusting device as defined in claim 2 in which at least one of the rods includes an enlarged head; and in which said first rod retaining means is interposed between said enlarged head and said sleeve.

4. A safety belt adjusting device as defined in claim 3 in which at least one of the rods has a threaded end to releasably and threadably accept a nut; in which said nut is removable from said threaded portion; and in which at least one rod is removable from at least one of said first and second rod retaining means to permit a safety belt to be interposed between said spaced apart rods.

5. A safety belt adjusting device as defined in claim 4 in which the second rod retaining means is interposed between said sleeve and said nut.

6. A safety belt adjusting device as defined in claim 1 in which the spaced apart plates define a belt slot therebetween which is substantially equal to the width of a safety belt on which the safety belt adjusting device is installed.

7. A safety belt adjusting device as defined in claim 1 in which at least one rod is snap fitted into at least one of the spaced apart plates such that before said rod and said spaced apart plates are snap fitted together, a safety belt may be interposed between said spaced apart rods.

8. A safety belt comprising:

a shoulder belt;

a lap belt and a buckle;

a pair of spaced apart rods, each rod having a first end and a second end;

a first rod retaining means adjacent the first ends of said pair of rods for retaining the rods in the spaced apart relationship;

a second rod retaining means adjacent the second ends of said pair of rods for retaining the rods in a spaced apart relationship;

a belt slot extending intermediate the pair of spaced apart rods whereby the lap belt and the shoulder belt extend through the belt slot;

release means for releasing one of the first and second rod retaining means from at least one of the rods;

said first and second rod retaining means permitting rotational movement of one of said rods relative to the other of said rods; and said belt slot allows said rods to slide on said lap and shoulder belt between a first position adjacent said buckle and a second position adjacent a passenger's stomach to substantially increase the angle of the shoulder belt relative to the lap belt, and move the shoulder belt away from a passenger's neck.

9. A safety belt adjusting device as defined in claim 8 in which the first and second rod retaining means are spaced apart plates; and in which each plate has a hole for accepting each respective rod.

10. A safety belt adjusting device as defined in claim 9 in which the plates are rotatably mounted on said pair of rods to permit the rods to move to a skewed position relative to one another to guide the shoulder belt when said safety belt adjusting device is positioned adjacent the passenger's stomach.

11. A safety belt adjusting device as defined in claim 10 further comprising a sleeve extending over each of said rods, and extending between said first rod retaining means and said second rod retaining means.

12. A safety belt adjusting device as defined in claim 11 in which at least one of the rods includes an enlarged head; and in which said first rod retaining means is interposed between said enlarged head and said sleeve.

13. A safety belt adjusting device as defined in claim 12 in which at least one of the rods has one threaded end to releasably and threadably accept a nut; said nut being removable from said threaded rod; and said threaded rod being removable from at least one of said first and second rod retaining means to permit a safety belt to be interposed between said spaced apart rods.

\* \* \* \* \*